US012567635B2

(12) United States Patent

Shimizu et al.

(10) Patent No.: US 12,567,635 B2

(45) Date of Patent: Mar. 3, 2026

(54) VEHICLE WITH DETACHABLY MOUNTED BATTERY

(71) Applicant: TOYOTA JIDOSHA KABUSHIKI KAISHA, Toyota (JP)

(72) Inventors: Tatsuya Shimizu, Okazaki (JP); Katsuya Shimazu, Toyota (JP); Ayaka Kagami, Inazawa (JP); Mutsumi Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 18/479,945

(22) Filed: Oct. 3, 2023

(65) Prior Publication Data

US 2024/0178500 A1 May 30, 2024

(30) Foreign Application Priority Data

Nov. 29, 2022 (JP) ................................. 2022-189800

(51) Int. Cl.

| | |
|---|---|
| *H01M 50/249* | (2021.01) |
| *H01M 10/613* | (2014.01) |
| *H01M 10/625* | (2014.01) |
| *H01M 10/6568* | (2014.01) |
| *H01M 50/24* | (2021.01) |
| *H01M 50/296* | (2021.01) |
| *B60L 50/60* | (2019.01) |
| *B60L 53/80* | (2019.01) |

(52) U.S. Cl.
CPC ....... *H01M 50/249* (2021.01); *H01M 10/613* (2015.04); *H01M 10/625* (2015.04); *H01M 10/6568* (2015.04); *H01M 50/24* (2021.01);

*H01M 50/296* (2021.01); *B60L 50/60* (2019.02); *B60L 53/80* (2019.02); *H01M 2220/20* (2013.01)

(58) Field of Classification Search
CPC .. H01M 50/249; H01M 50/24; H01M 50/296; H01M 10/613; H01M 10/625; H01M 10/6568; H01M 2220/20; B60L 50/60; B60L 53/80

See application file for complete search history.

(56) References Cited

U.S. PATENT DOCUMENTS

| | | | |
|---|---|---|---|
| 8,894,431 B2 | 11/2014 | Tiberghien et al. | |
| 2013/0309886 A1 | 11/2013 | Tiberghien et al. | |
| 2014/0060944 A1 | 3/2014 | Fillion et al. | |
| 2016/0226041 A1* | 8/2016 | Jackson ................... | B60K 1/04 |

(Continued)

FOREIGN PATENT DOCUMENTS

| | | |
|---|---|---|
| CN | 106926825 A | 7/2017 |
| CN | 106926825 B | 10/2019 |

(Continued)

*Primary Examiner* — Edwin A Young

(74) *Attorney, Agent, or Firm* — Sughrue Mion, PLLC

(57) ABSTRACT

A vehicle includes a vehicle body including a mounting portion that opens downward and that is configured to mount a battery, and the battery that is detachably mountable to the mounting portion. The battery includes a battery main body and a battery-side connecting portion that protrudes upward from the battery main body. The mounting portion includes a vehicle-body-side connecting portion that fits with the battery-side connecting portion. The battery-side connecting portion is movable relative to the battery main body in a lateral direction.

6 Claims, 9 Drawing Sheets

(56)                    References Cited

U.S. PATENT DOCUMENTS

| 2020/0119477 | A1 |   | 4/2020 | Kwon et al. |
| 2022/0314769 | A1 | * | 10/2022 | Srivastava ........... B60L 53/305 |

FOREIGN PATENT DOCUMENTS

| CN | 215204397 | U | 12/2021 |
| JP | 51-021230 | A | 2/1976 |
| JP | 2003-035389 | A | 2/2003 |
| JP | 2014-513858 | A | 6/2014 |
| WO | 2022/213102 | A1 | 10/2022 |

* cited by examiner

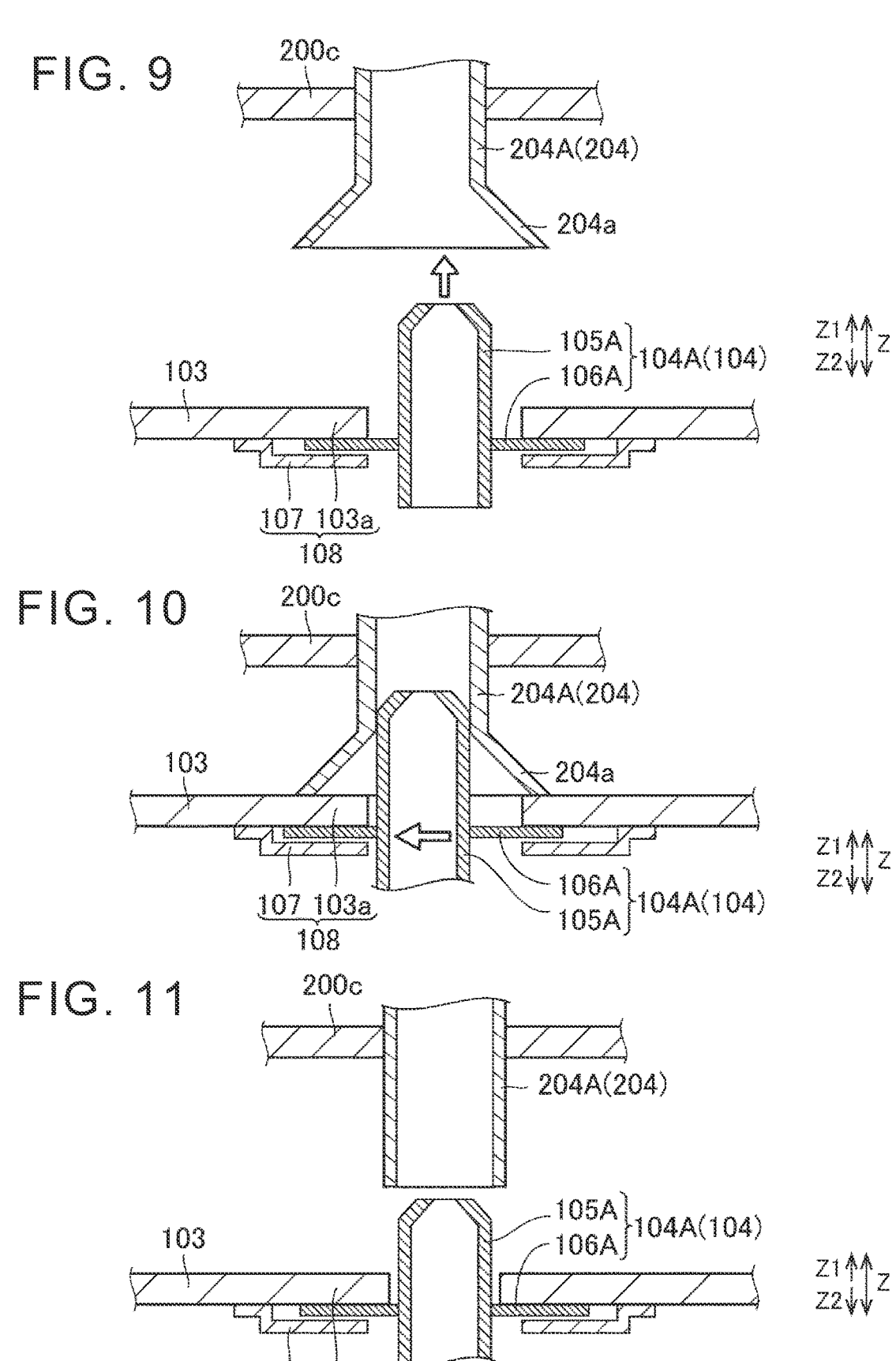

VEHICLE WITH DETACHABLY MOUNTED BATTERY

CROSS-REFERENCE TO RELATED APPLICATION

This application claims priority to Japanese Patent Application No. 2022-189800 filed on Nov. 29, 2022, incorporated herein by reference in its entirety.

BACKGROUND

1. Technical Field

The present disclosure relates to a vehicle.

2. Description of Related Art

Vehicles, of which batteries are replaceable, are conventionally known. For example, CN 106926825 A describes inserting battery-side piping into vehicle-body-side piping.

SUMMARY

In a vehicle such as that described in CN 106926825 A, aligning a vehicle-body-side connecting portion with a battery-side connecting portion is difficult.

The present disclosure provides a vehicle in which a vehicle-body-side connecting portion and a battery-side connecting portion can be easily aligned.

A vehicle according to one aspect of the present disclosure includes a vehicle body including a mounting portion that opens downward and that is configured to mount a battery, and the battery that is detachably mountable to the mounting portion. The battery includes a battery main body and a battery-side connecting portion that protrudes upward from the battery main body, the mounting portion includes a vehicle-body-side connecting portion that fits with the battery-side connecting portion, and the battery-side connecting portion is movable relative to the battery main body in a lateral direction.

The present disclosure can provide a vehicle in which the vehicle-body-side connecting portion and the battery-side connecting portion can be easily aligned.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a plan view illustrating a vehicle stop area in the battery replacing device;

FIG. 3 is a diagram schematically illustrating a configuration of a battery placement table and a lift unit;

FIG. 9 is a cross-sectional view schematically illustrating a state prior to a battery-side connecting portion being connected to a vehicle-body-side connecting portion;

FIG. 10 is a cross-sectional view schematically illustrating a state in which the battery-side connecting portion is connected to the vehicle-body-side connecting portion;

FIG. 11 is a diagram schematically illustrating a configuration of a modification of the battery-side connecting portion and the vehicle-body-side connecting portion;

DETAILED DESCRIPTION OF EMBODIMENTS

An embodiment of the present disclosure will be described below in detail with reference to the drawings. The same or corresponding parts are denoted by the same signs throughout the drawings, and description thereof will not be repeated.

Figure 1:
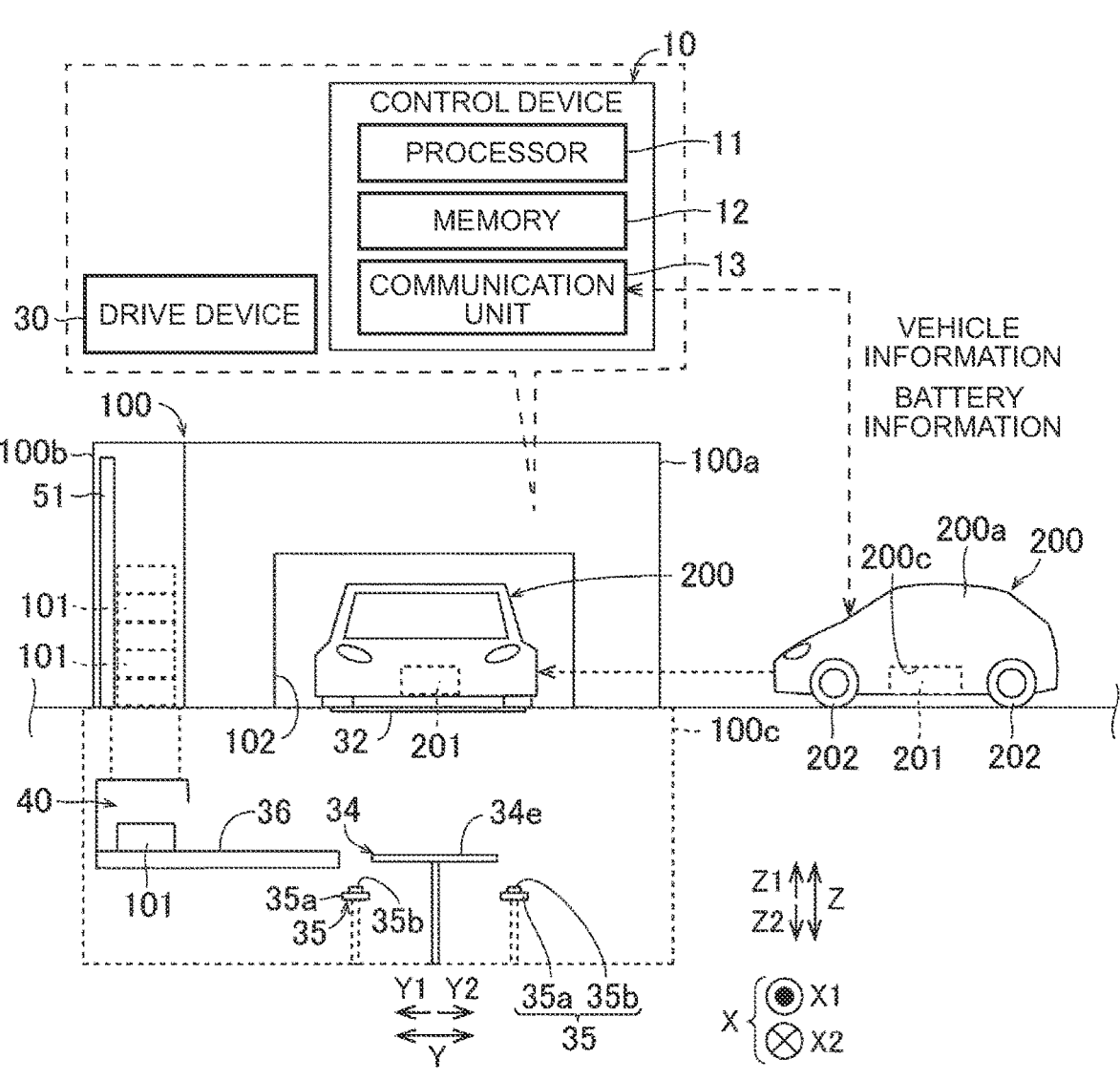
FIG. 1 is a diagram schematically illustrating a battery replacing device according to an embodiment of the present disclosure.

FIG. 1 is a diagram illustrating a battery replacing device 100 and an electrified vehicle 200 according to the present embodiment. The battery replacing device 100 is a device for replacing a battery (used battery) 201 attached to the electrified vehicle 200 with a battery (new battery) 101 that is charged. The battery 201 and the battery 101 are examples of a "first battery" and a "second battery" of the present disclosure, respectively.

Configuration of Electrified Vehicle

Figures 2, 3:
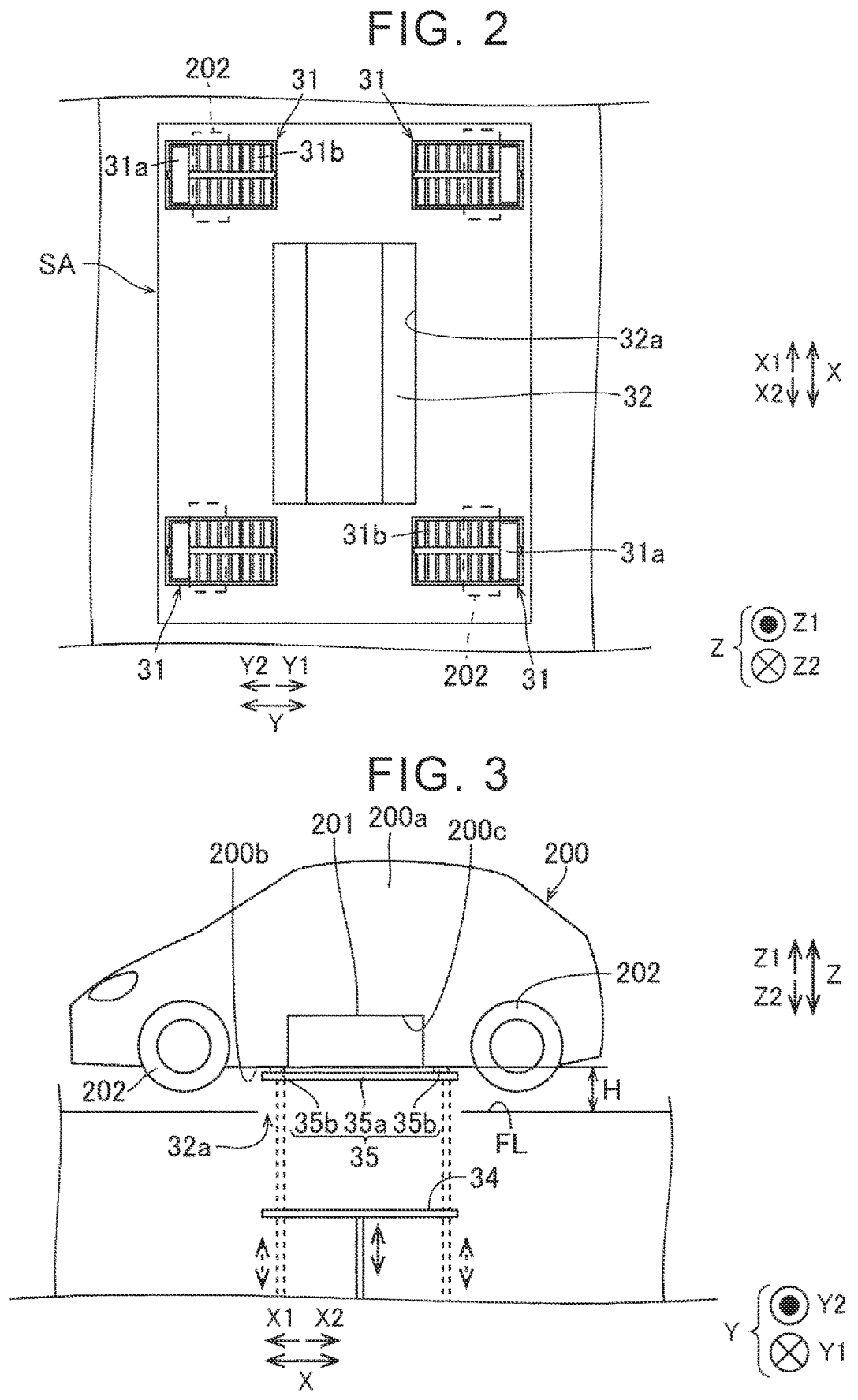

As illustrated in FIG. 3, a vehicle body 200a of the electrified vehicle 200 has a mounting portion 200c in which the batteries 101, 201 can be mounted. As illustrated in FIG. 3, the mounting portion 200c is open downward. The mounting portion 200c has a shape recessed upward from a lower face 200b of the vehicle body 200a. The batteries 101 and 201 are detachable from the mounting portion 200c. Specifically, the batteries 101 and 201 are fastened to the mounting portion 200c by fastening members 201g (see FIG. 7) such as bolts or the like.

Figures 7, 8:
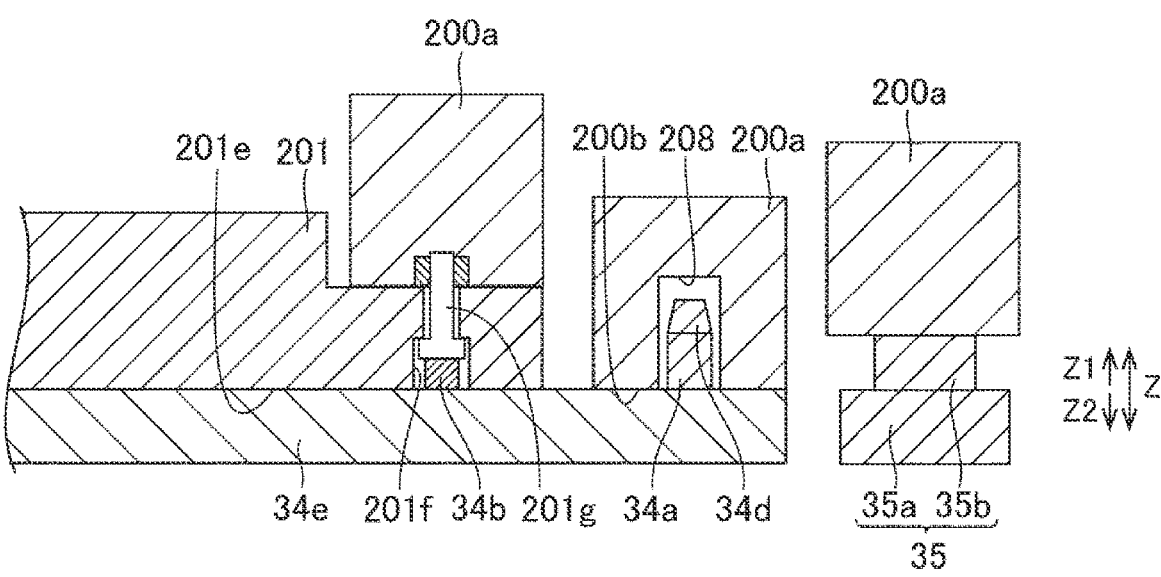
FIG. 7 is a diagram schematically illustrating a state in which the battery placement table and the electrified vehicle are positioned relative to each other.
FIG. 8 is a perspective view schematically illustrating a configuration of a battery.

Next, a configuration of the batteries will be described with reference to FIGS. 8 to 10. The battery 101 will be described below as an example. As illustrated in FIG. 8, the battery 101 has a battery main body 103 and a battery-side connecting portion 104.

The battery-side connecting portion 104 protrudes upward from the battery main body 103. The battery-side connecting portion 104 includes a battery-side coolant pipe 104A and a battery-side connector 104B.

The battery-side coolant pipe 104A is piping through which a coolant for cooling the battery main body 103 flows.

As illustrated in FIGS. 9 and 10, the battery-side coolant pipe 104A has a connecting shaft portion 105A and a plate 106A.

The connecting shaft portion 105A is formed linearly. The connecting shaft portion 105A is formed cylindrically.

The plate 106A protrudes outward from the connecting shaft portion 105A in a direction orthogonal to an axial direction of the connecting shaft portion 105A (up-down direction in FIG. 9). The plate 106A is formed in a disc shape. The plate 106A is configured to be removable from the connecting shaft portion 105A. For example, a male screw thread is formed on an outer peripheral face of the connecting shaft portion 105A, and a female screw thread is also formed on an inner peripheral face of the plate 106A. This facilitates replacement of the plate 106A.

The battery-side connector 104B can electrically connect the battery main body 103 to the vehicle body 200a. The battery-side connector 104B has a connecting shaft portion (omitted from illustration) and a plate (omitted from illustration). The connecting shaft portion is formed linearly. The connecting shaft portion is formed cylindrically. A configuration of the plate is the same as the configuration of the plate 106A of the battery-side coolant pipe 104A.

As illustrated in FIGS. 9 and 10, the battery main body 103 has a holding portion 108 that holds the plate 106A of the battery-side coolant pipe 104A by clamping from both sides in the up-down direction. The holding portion 108 has an enclosing portion 103a in the battery main body 103, which surrounds an insertion opening through which the connecting shaft portion 105A is inserted, and a lower holding portion 107 therein, which is connected to a lower face of the enclosing portion 103a. The holding portion 108 holds the plate 106A such that the plate 106A can move in a lateral direction.

Although omitted from illustration, the battery main body 103 also has a holding portion that holds the plate of the battery-side connector 104B by clamping from both sides in the up-down direction. This holding portion has a configuration similar to that of the holding portion 108 described above.

The mounting portion 200c has a vehicle-body-side connecting portion 204 that fits onto the battery-side connecting portion 104. The vehicle-body-side connecting portion 204 includes a vehicle-body-side coolant pipe 204A (see FIGS. 9 and 10) and a vehicle-body-side connector (omitted from illustration). The vehicle-body-side coolant pipe 204A is piping that fits into the battery-side coolant pipe 104A. The vehicle-body-side connector is a connector that can be electrically connected to the battery-side connector 104B.

As illustrated in FIGS. 9 and 10, the vehicle-body-side coolant pipe 204A has a guide portion 204a that guides the battery-side coolant pipe 104A. The guide portion 204a has a shape of which the diameter gradually expands the further downward. A guide portion may be provided on the vehicle-body-side connector.

Configuration of Battery Replacing Device

The battery replacing device 100 includes a battery replacing station 100a, a storage compartment 100b, and an underfloor area 100c.

The battery replacing station 100a is a station where removal of the battery 201 from the electrified vehicle 200 and attachment of the battery 101 to the electrified vehicle 200 are performed. The battery replacing station 100a is provided with an entrance 102 from which the electrified vehicle 200 enters and exits.

The storage compartment 100b stores batteries 101 that are charged. The storage compartment 100b is built annexed to the battery replacing station 100a. A charging facility 51 capable of charging the battery 201 removed from the electrified vehicle 200 is provided in the storage compartment 100b. The battery 201 is charged by the charging facility 51 in the storage compartment 100b. The battery 101 charged in the storage compartment 100b, i.e., the battery 101 that is charged is transported to the electrified vehicle 200 after being moved to a temporary storage site 40 provided in the underfloor area 100c.

The underfloor area 100c is provided below the battery replacing station 100a and the storage compartment 100b. The underfloor area 100c is provided with a battery placement table 34, a lift unit 35, and a transporting unit 36, which will be described later.

The battery replacing device 100 includes a control device 10 and a drive device 30.

The control device 10 includes a processor 11, memory 12, and a communication unit 13. The memory 12 stores programs to be executed by the processor 11, as well as information used by the programs (e.g., maps, mathematical expressions, and various types of parameters). The processor 11 controls the drive device 30, which will be described in detail later.

The communication unit 13 includes various types of communication interfaces. The processor 11 controls the communication unit 13. The communication unit 13 communicates with a data communication module (DCM) and so forth of the electrified vehicle 200. Bi-directional communication can be performed between the communication unit 13 and the electrified vehicle 200. Note that the communication unit 13 may communicate with a mobile terminal or the like owned by a user of the electrified vehicle 200.

As illustrated in FIG. 2, the battery replacing device 100 is provided with a vehicle stop area SA. When the user performs an operation to instruct starting of battery replacement work at a navigation system (omitted from illustration) of the electrified vehicle 200 in a state in which the electrified vehicle 200 is stopped in the vehicle stop area SA, the communication unit 13 receives an instruction signal to start the battery replacement work from the electrified vehicle 200. The processor 11 starts controlling the battery replacement work based on reception of the instruction signal by the communication unit 13. Note that the electrified vehicle 200 stops in the vehicle stop area SA such that a front-rear direction matches an X direction and a right-left direction matches a Y direction.

The drive device 30 includes wheel securing units 31 (see FIG. 2), a shutter 32 (see FIG. 2), the battery placement table 34 (see FIG. 1), the lift unit 35 (see FIG. 1), and the transporting unit 36 (See FIG. 1).

Referring to FIG. 2 again, four of the wheel securing units 31 are provided in the vehicle stop area SA. The wheel securing units 31 are provided so as to correspond to each of four wheels 202 of electrified vehicle 200.

Each of the wheel securing units 31 includes a pressing member 31a and a lateral roller portion 31b. The pressing members 31a move the wheels 202 by pressing the wheels 202 from the outer side thereof (sideward). The pressing members 31a are disposed straddling the lateral roller portions 31b. Thus, the wheels 202 are positioned by the wheel securing units 31.

The lateral roller portions 31b are made up of a plurality of rollers of which the rotation axes extend in the X direction. The rollers of the lateral roller portion 31b are arrayed in the Y direction. Rotating the rollers of the lateral roller portions 31b moves the pressing members 31a in the Y direction.

As illustrated in FIG. 2, the shutter 32 is provided in the vehicle stop area SA. The shutter 32 is configured to be capable of opening and closing an opening portion 32a formed in a floor surface FL of the vehicle stop area SA. The shutter 32 can be switched between an open state in which the opening portion 32a is open and a closed state in which the opening portion 32a is closed.

The lift unit 35 can move in the up-down direction through the opening portion 32a, between a position higher than the floor surface FL and a position lower than the floor surface FL. As illustrated in FIG. 3, the lift unit 35 can rise to a position where the wheels 202 of the electrified vehicle 200 are lifted off of the floor surface FL, in a state of holding the electrified vehicle 200 from below. The lift unit 35 raises the electrified vehicle so that a height H of the lower face 200b of the vehicle body 200a from the floor surface FL reaches a predetermined height.

The lift unit 35 includes a pair of lifting bars 35a that are disposed spaced apart in a direction (Y direction) orthogonal to the up-down direction. Each of the lifting bars 35a is provided with two projecting portions 35b projecting upward. The electrified vehicle 200 is supported from below by two projecting portions 35b of each of the lifting bars 35a, (i.e., four projecting portions 35b).

Figure 4:
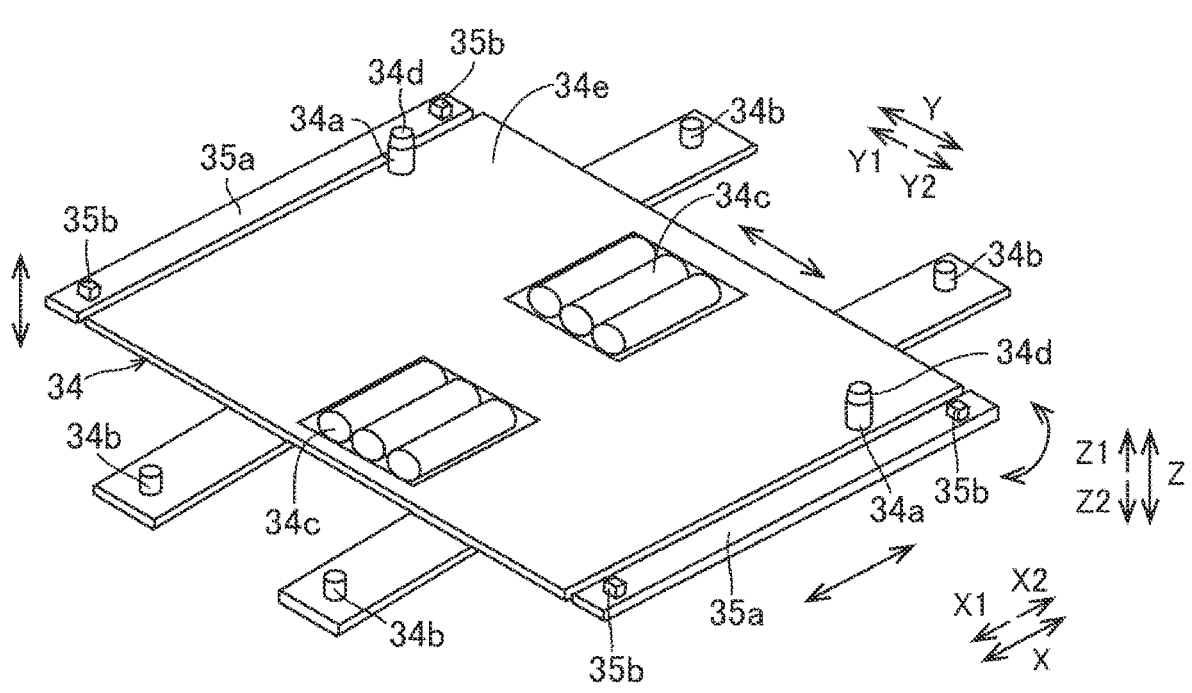
FIG. 4 is a perspective view schematically illustrating the configuration of the battery placement table and the lift unit.

The battery placement table 34 is disposed below the battery replacing station 100a, more specifically below the opening portion 32a. The battery placement table 34 is capable of having the batteries 101 and 201 placed thereon and is movable in the up-down direction. As illustrated in FIG. 4, the battery placement table 34 has a base portion 34e, two positioning pins 34a, four locking/unlocking tools 34b, and roller portions 34c.

The base portion 34e is disposed between the lifting bars 35a. The base portion 34e is movable in the up-down direction. The base portion 34e is formed having a form of a flat plate. The base portion 34e has an outer shape that is larger than the outer shape of the batteries 101 and 201. The base portion 34e is configured to be movable in the lateral direction below the electrified vehicle 200. Specifically, the base portion 34e is movable in the X direction (X1 direction, X2 direction) and the Y direction (Y1 direction, Y2 direction). The base portion 34e is rotatable so as to change the orientation (angle) thereof in the XY plane. Note that each of the lifting bars 35a may also be movable in the same manner as the base portion 34e.

Each positioning pin 34a is provided on the base portion 34e. Each positioning pin 34a is a part for performing positioning of the vehicle body 200a of the electrified vehicle 200 and the base portion 34e. One positioning pin 34a is provided at one end portion of the base portion 34e in a direction parallel to the vehicle width direction (Y direction). The other positioning pin 34a is provided at the other end portion of the base portion 34e in the direction parallel to the vehicle width direction (Y direction).

Figure 5:
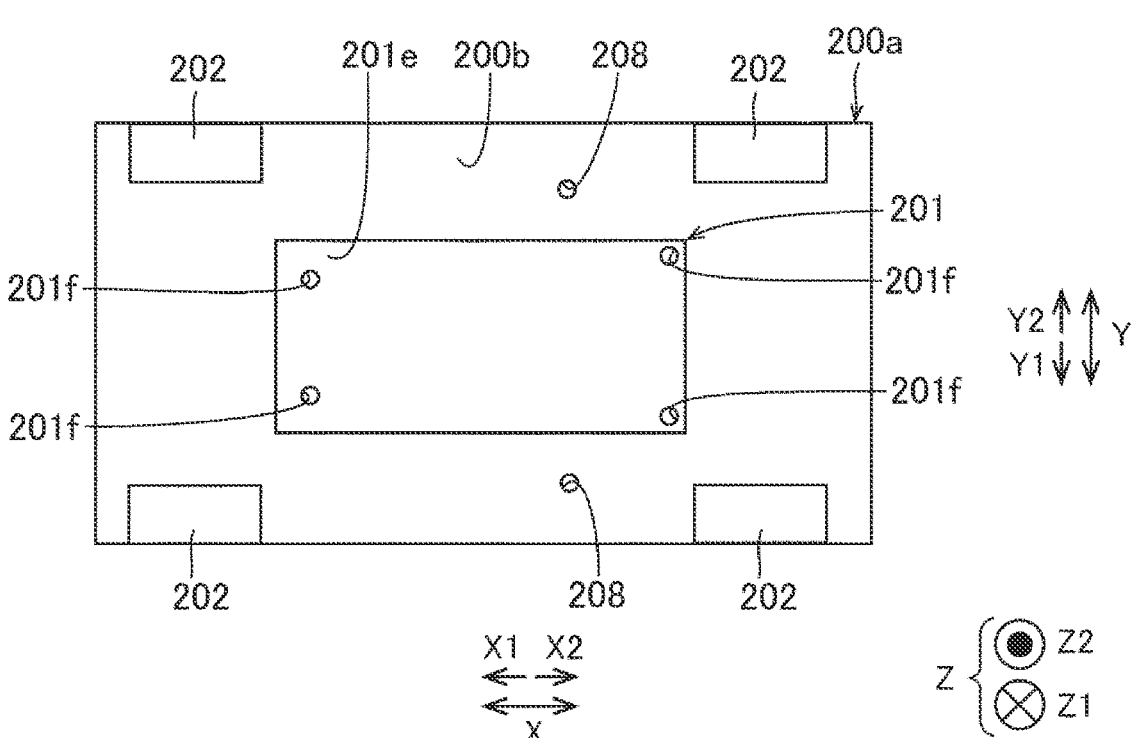
FIG. 5 is a bottom view of an electrified vehicle.

As illustrated in FIG. 5, the lower face 200b of the vehicle body 200a of the electrified vehicle 200 is provided with pin insertion holes 208 into which the positioning pins 34a are inserted. Each positioning pin 34a is insertable into a corresponding one of the pin insertion holes 208.

Each locking/unlocking tool 34b is movable in the up-down direction. Each locking/unlocking tool 34b is movable in the up-down direction with respect to the base portion 34e. As illustrated in FIG. 4, each locking/unlocking tool 34b is disposed on an inward side of the positioning pins 34a in the Y direction. Each locking/unlocking tool 34b is disposed on an outer side of the base portion 34e in the X direction.

As illustrated in FIG. 5, the battery 201 has a bottom face 201e, and the bottom face 201e is provided with tool insertion holes 201f into which the locking/unlocking tools 34b are inserted. Tool insertion holes are also provided on a bottom face of the battery 101. Each locking/unlocking tool 34b can be inserted into a corresponding one of the tool insertion holes.

The roller portions 34c are provided in the base portion 34e. The roller portions 34c are rotatable about rotation axes extending in the X direction. Rotating the roller portions 34c in one direction moves the batteries 101 and 201 relative to the base portion 34e to one side in the Y direction (e.g., to the Y1 side), and rotating the roller portions 34c in the other direction moves the batteries 101 and 201 relative to the base portion 34e to the other side in the Y direction.

A marker 34d is provided at a distal end portion of each positioning pin 34a. The marker 34d may have an upwardly tapered form.

Referring to FIG. 1 again, the transporting unit 36 transports the battery 101 stored in the storage compartment 100b toward the battery placement table 34. Specifically, the underfloor area 100c is provided with the temporary storage site 40 for temporarily storing the charged battery 101 that was stored in the storage compartment 100b, and the transporting unit 36 can transport the battery 101 from the temporary storage site 40 toward the battery placement table 34. Note that the transporting unit 36 may be of a conveyor belt type, for example.

Battery Replacement Method

Figure 6:
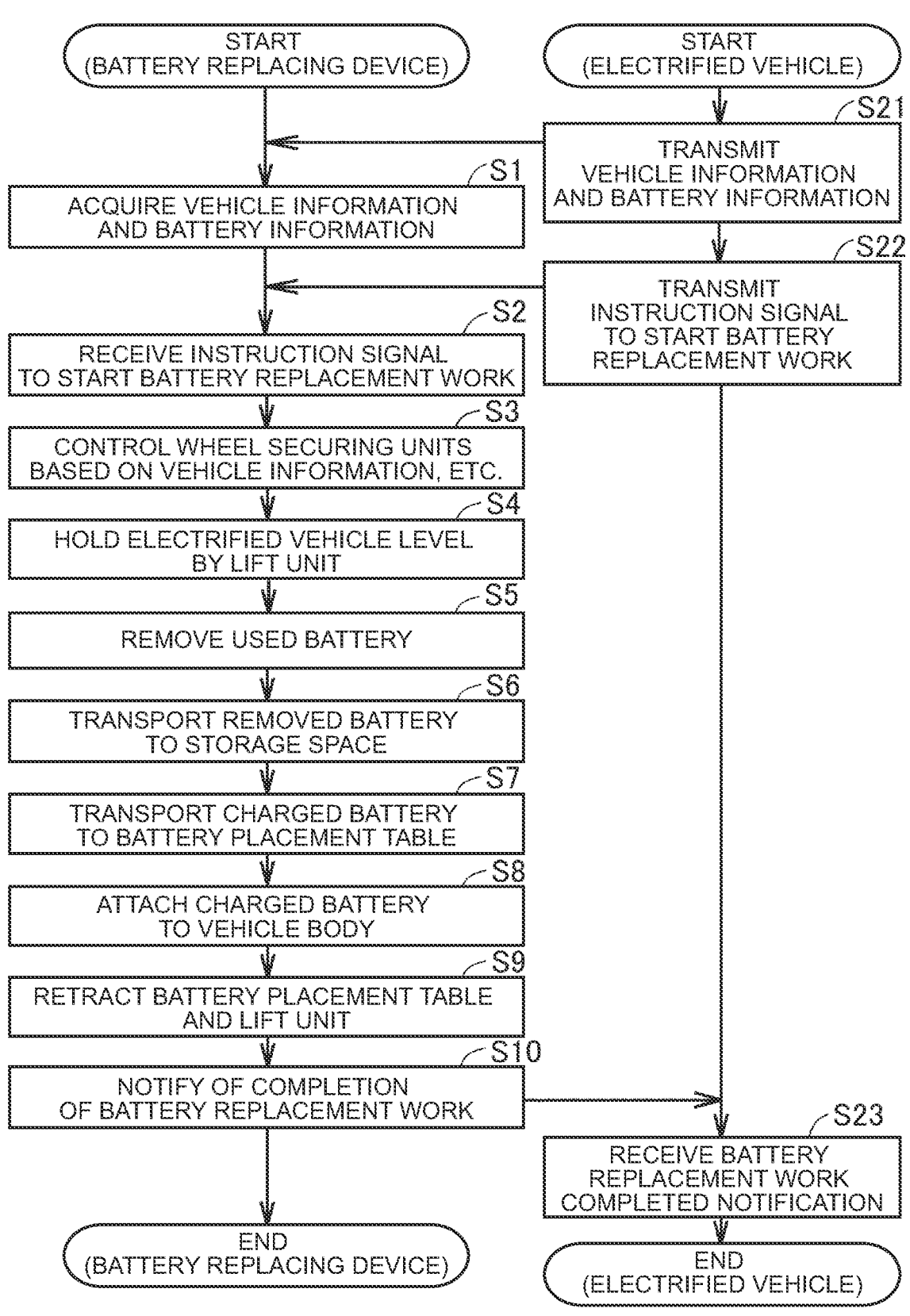
FIG. 6 is a flowchart showing each step carried out by the battery replacing device.

Next, a battery replacement method using the battery replacing device 100 will be described with reference to the flowchart (sequence diagram) of FIG. 6.

Transmission of Vehicle Information, Etc. (Performed at Electrified Vehicle Side)

First, in step S21, the electrified vehicle 200 transmits information about the electrified vehicle 200 and information about the battery 201 to the communication unit 13 of the battery replacing device 100. For example, an operation is made at an automotive navigation system (omitted from illustration) of the electrified vehicle 200, to transmit each of the above information, thereby transmitting each of the above information to the communication unit 13. The electrified vehicle 200 transmits each piece of the above information before entering the battery replacing device 100. Note that each piece of the above information may be transmitted after the electrified vehicle 200 enters the battery replacing device 100.

Acquisition of Vehicle Information, Etc. (Performed at Battery Replacing Device Side)

Next, in step S1, the communication unit 13 of the battery replacing device 100 acquires, through communication, the information about the electrified vehicle 200 and the information about the battery 201, transmitted from the electrified vehicle 200 in step S21. Each piece of the acquired information is stored in the memory 12 (see FIG. 1).

The communication unit 13 may also acquire information regarding capacity (charge capacity) of the battery 201 and the state of charge (SOC) of the battery 201.

Transmission of Instruction Signal for Battery Replacement Work (Performed at Electrified Vehicle Side)

Next, in step S22, the electrified vehicle 200 that is stopped in the vehicle stop area SA transmits an instruction signal to the communication unit 13, to start battery replacement work.

Reception of Instruction Signal for Battery Replacement Work (Performed at Battery Replacing Device Side)

Next, in step S2, the communication unit 13 receives the instruction signal transmitted from the electrified vehicle 200 in step S22. Note that in step S2, upon receiving the instruction signal, the processor 11 may transmit an instruction message or the like to the user of electrified vehicle 200 through the communication unit 13, for turning ignition power to an off state.

Control of Wheel Securing Units (Performed at Battery Replacing Device Side)

Next, in step S3, the processor 11 adjusts the positions of the wheel securing units 31 (see FIG. 2) based on the information (vehicle information and battery information) acquired through the communication unit 13 in step S1. Note that the processor 11 may control each of the four wheel securing units 31 independently of each other.

Accordingly, the position and the orientation of the vehicle body 200a in the lateral direction are adjusted, and also the position and the orientation of the battery 201 in the lateral direction are adjusted. As a result, the battery 201 is moved to a predetermined position above the opening portion 32a.

Holding Vehicle Body Level (Performed at Battery Replacing Device Side)

Next, in step S4, the processor 11 places the shutter 32 in an open state and raises the lift unit 35 in the state in which the shutter 32 is open. Thus, after passing through the opening portion 32a, the lift unit 35 lifts the electrified vehicle 200 so that the height H of the lower face 200b of the vehicle body 200a from the floor surface FL reaches a predetermined height (see FIG. 3).

Removal of Used Battery (Performed at Battery Replacing Device Side)

Next, in step S5, the used battery 201 is removed from the vehicle body 200a of the electrified vehicle 200. First, the processor 11 raises the battery placement table 34. Thus, as illustrated in FIG. 7, the positioning pins 34a are inserted into the pin insertion holes 208 formed in the lower face 200b of the vehicle body 200a, and also the locking/unlocking tools 34b are inserted into the tool insertion holes 201f formed in the bottom face 201e of the battery 201, and the base portion 34e either abuts or approaches the bottom face 201e of the battery 201. As a result, the battery placement table 34 is positioned with respect to the electrified vehicle 200 (i.e., as to the battery 201). Note that at this time, the positioning pins 34a are inserted into the pin insertion holes 208 prior to the locking/unlocking tools 34b being inserted into the tool insertion holes 201f.

Next, the processor 11 raises the locking/unlocking tools 34b in a state in which the locking/unlocking tools 34b are inserted into the tool insertion holes 201f. The processor 11 then drives (rotates) the locking/unlocking tools 34b inserted into the tool insertion holes 201f. This unlocks the fastening members 201g in the tool insertion holes 201f. As a result, the battery 201 is removed from the vehicle body 200a, and placed on the base portion 34e. Note that the timing at which the positioning pins 34a are inserted into the pin insertion holes 208 and the timing at which the locking/unlocking tools 34b are inserted into the tool insertion holes 201f may be the same as each other.

Transporting Used Battery to Storage Compartment (Performed at Battery Replacing Device Side)

Next, in step S6, the battery 201 removed from the vehicle body 200a in step S5 is transported to the storage compartment 100b (see FIG. 1). First, the processor 11 lowers the battery placement table 34, on which the battery 201 is placed, to the height position of the transporting unit 36 (see FIG. 1). Next, the processor 11 lowers the lift unit 35 to a position below the battery placement table 34 (e.g., the position illustrated in FIG. 1). Thus, the vehicle body 200a is no longer held by the lift unit 35, and consequently the electrified vehicle 200 is placed on the floor surface FL of the vehicle stop area SA. Subsequently, the processor 11 drives the roller portions 34c (see FIG. 4) of the battery placement table 34 so that the battery 201 moves over the base portion 34e, in a storage direction (Y1 direction). Accordingly, the battery 201 placed on the base portion 34e moves over the base portion 34e toward the transporting unit 36, and is relocated from the base portion 34e onto the transporting unit 36. The battery 201 is transported to the temporary storage site 40 by the transporting unit 36 and thereafter stored in the storage compartment 100b.

Transporting Charged Battery to Battery Placement Table (Performed at Battery Replacing Device Side)

Next, in step S7, the processor 11 transports the charged battery 101 stored in the storage compartment 100b to the battery placement table 34. Specifically, after transporting the battery 101 from the storage compartment 100b to the temporary storage site 40 in the underfloor area 100c, the processor 11 transports the battery 101 in a transport direction (Y2 direction) from the temporary storage site 40 to the battery placement table 34 by the transporting unit 36. Upon the battery 101 being relocated from the transporting unit 36 to the base portion 34e, the processor 11 drives the roller portion 34c so that the battery 101 moves over the base portion 34e in the conveying direction. As a result, the battery 101 stops at a predetermined position on the base portion 34e.

Installing Charged Battery (Performed at Battery Replacing Device Side)

Next, in step S8, the processor 11 performs control to attach the battery 101 that is charged to the vehicle body 200a. Specifically, the processor 11 raises the lift unit 35 so that the height H of the lower face 200b of the vehicle body 200a from the floor surface FL of the vehicle stop area SA reaches a predetermined height.

Subsequently, the processor 11 raises the battery placement table 34. Accordingly, the positioning pins 34a are inserted into the pin insertion holes. Now, in the present embodiment, the battery-side connecting portion 104 is movable relative to the battery main body 103 in the lateral direction, and accordingly connection is performed in a state in which the battery-side connecting portion 104 is appropriately aligned with the vehicle-body-side connecting portion 204. The processor 11 raises the locking/unlocking tools 34b in this state. Thus, the locking/unlocking tools 34b are inserted into the tool insertion holes of the battery 101. The processor 11 then drives (rotates) the locking/unlocking tools 34b. Accordingly, the bolts inside the tool insertion holes are locked. Upon detecting that all the bolts are locked, the vehicle-body-side connecting portion 204 and the battery-side connecting portion 104 are locked. As a result, attachment of the battery 101 that is charged, to the vehicle body 200a, is completed.

Retraction of Battery Placement Table and Lift Unit (Performed at Battery Replacing Device Side)

Next, in step S9, the processor 11 lowers the battery placement table 34 and the lift unit 35, and performs retraction thereof from the electrified vehicle 200. Thereafter, the processor 11 places the shutter 32 in a closed state (see FIG. 2).

Notification of Battery Replacement Work Completion (Performed at Battery Replacing Device Side)

Next, in step S10, the processor 11 notifies the electrified vehicle 200 through the communication unit 13 that the battery replacement work has been completed.

Reception of Battery Replacement Work Completion Notification (Performed at Electrified Vehicle Side)

In the following step S23, the electrified vehicle 200 receives the notification transmitted from the communication unit 13 of the battery replacing device 100 in step S10. Thus, the electrified vehicle 200 is brought into a state in which the ignition power can be turned on. Thereafter, the processing ends.

Although the above-described embodiment illustrates an example in which the position of the drive device 30 is adjusted based on information on each of the electrified vehicle 200 and the battery 201, the present disclosure is not limited to this. The position of the drive device 30 may be adjusted based on information regarding either one of the electrified vehicle 200 and the battery 201.

As described above, in the electrified vehicle 200 according to the present embodiment, the battery-side connecting portion 104 is movable relative to the battery main body 103 in the lateral direction, and accordingly, the vehicle-body-side connecting portion 204 and the battery-side connecting portion 104 can be easily aligned.

A plurality of modifications of the above embodiment will be described below.

First Modification

As illustrated in FIG. 11, the guide portion 204a of the vehicle-body-side connecting portion 204 may be omitted.

Second Modification

Figure 12:
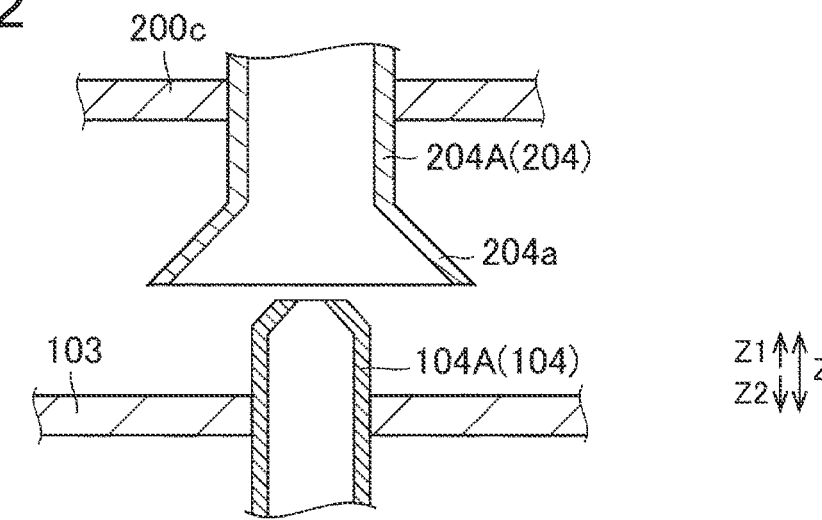
FIG. 12 is a diagram schematically illustrating a configuration of a modification of the battery-side connecting portion and the vehicle-body-side connecting portion.

As illustrated in FIG. 12, the plate of the battery-side connecting portion 104 may be omitted. In this case, the holding portion 108 of the battery main body 103 is also omitted. In this case, the battery-side connecting portion 104 is fixed to the battery main body 103 so that the battery-side connecting portion 104 does not move relative to the battery main body 103 in the lateral direction.

Third Modification

Figure 13:
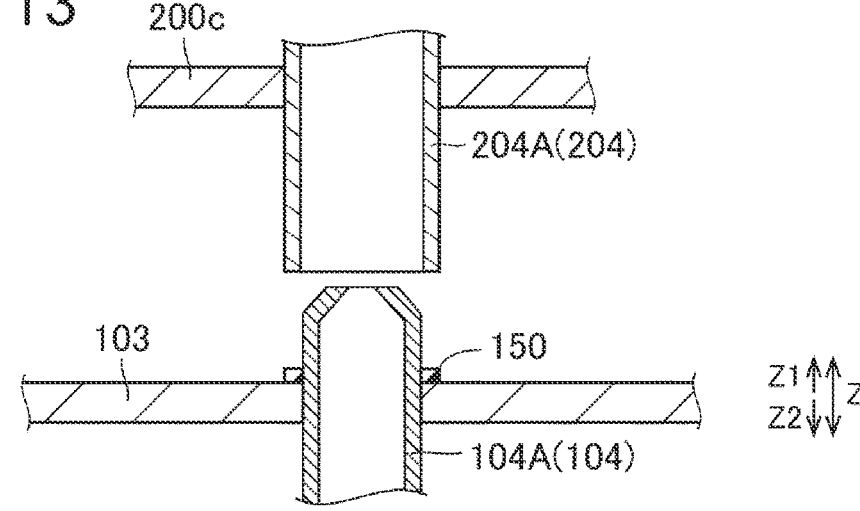
FIG. 13 is a diagram schematically illustrating a configuration of a modification of the battery-side connecting portion and the vehicle-body-side connecting portion.

As illustrated in FIG. 13, a seal member 150 may be provided between an outer peripheral face of the battery-side coolant pipe 104A and a distal end portion of the vehicle-body-side coolant pipe 204A. The seal member 150 may be fixed to the outer peripheral face of the battery-side coolant pipe 104A, or may be fixed to the distal end portion of the vehicle-body-side coolant pipe 204A. The seal member 150 is preferably fixed to the outer peripheral face of the battery-side coolant pipe 104A.

Fourth Modification

Figure 14:
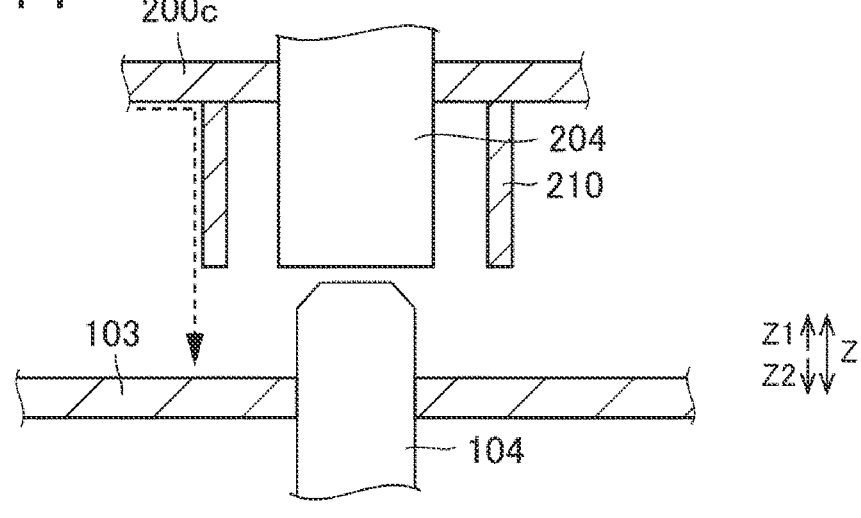
FIG. 14 is a diagram schematically illustrating a configuration of a modification of the battery-side connecting portion and the vehicle-body-side connecting portion.

As illustrated in FIG. 14, the mounting portion 200c may have a rainproofing portion 210 that is provided around the vehicle-body-side connecting portion 204 and has a shape that extends downward. The rainproofing portion 210 is formed in an annular shape surrounding the vehicle-body-side connecting portion 204.

Fifth Modification

Figure 15:
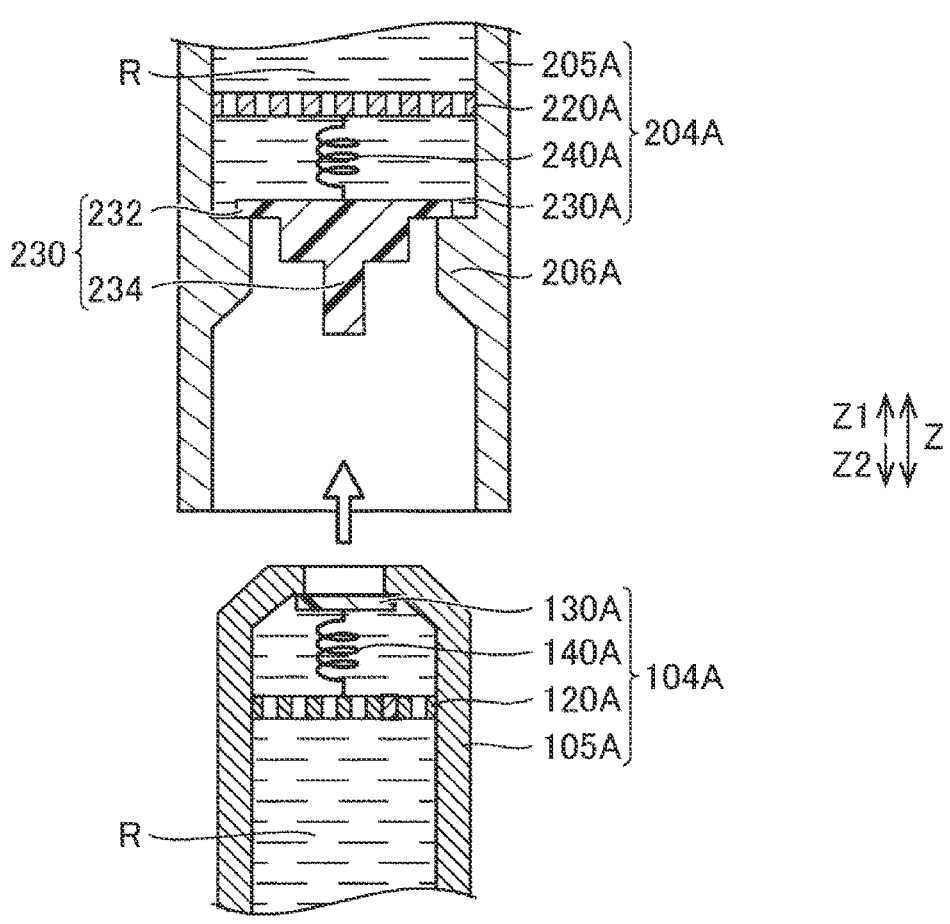
FIG. 15 is a diagram schematically illustrating a configuration of a modification of the battery-side connecting portion and the vehicle-body-side connecting portion.
Figure 16:
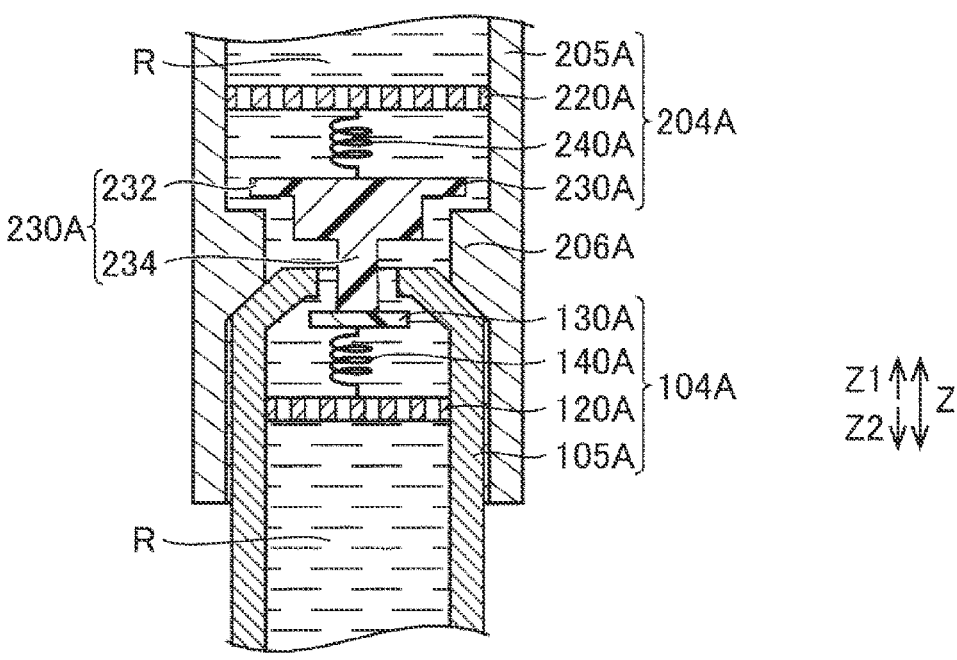
FIG. 16 is a diagram schematically illustrating the configuration of the modification of the battery-side connecting portion and the vehicle-body-side connecting portion illustrated in FIG. 15.

As illustrated in FIGS. 15 and 16, the battery-side coolant pipe 104A may be configured to cut off outflow of coolant R when removed from the vehicle-body-side coolant pipe 204A, and the vehicle-body-side coolant pipe 204A may be configured to cut off outflow of the coolant R when removed from the battery-side coolant pipe 104A.

The battery-side coolant pipe 104A has a connecting shaft portion 105A, a support plate 120A, a blocking member 130A, and a biasing member 140A.

The support plate 120A is fixed within the connecting shaft portion 105A. The support plate 120A allows passage of the coolant R. A plurality of through holes is formed in the support plate 120A.

The blocking member 130A has a shape that blocks an opening at a distal end portion of the connecting shaft portion 105A.

The biasing member 140A is disposed between the support plate 120A and the blocking member 130A. The biasing member 140A biases the blocking member 130A toward the distal end portion of the connecting shaft portion 105A.

The vehicle-body-side coolant pipe 204A has a connecting shaft portion 205A, a support plate 220A, a blocking member 230A, and a biasing member 240A.

The connecting shaft portion 205A is formed cylindrically. A receptacle 206A is formed on an inner peripheral face of the connecting shaft portion 205A. The receptacle 206A is a portion that receives the distal end portion of the connecting shaft portion 105A of the battery-side coolant pipe 104A. The receptacle 206A protrudes radially inward in the connecting shaft portion 205A from the inner peripheral face of the connecting shaft portion 205A. That is to say, the inner diameter of the receptacle 206A is smaller than the inner diameter of the connecting shaft portion 205A.

The support plate 220A is fixed on the inner peripheral face of the connecting shaft portion 205A. The support plate 220A allows passage of the coolant R. A plurality of through holes is formed in the support plate 220A.

The blocking member 230A has a shape that blocks an opening of the receptacle 206A. The blocking member 230A has an abutting portion 232 that abuts the receptacle 206A, and a pressing portion 234 that presses the blocking member 130A of the battery-side coolant pipe 104A.

The biasing member 240A is disposed between the support plate 220A and the blocking member 230A. The biasing member 240A biases the blocking member 230A toward the receptacle 206A.

In this example, when the connecting shaft portion 105A of the battery-side coolant pipe 104A is inserted into the connecting shaft portion 205A of the vehicle-body-side coolant pipe 204A, the pressing portion 234 presses the blocking member 130A against biasing force of the biasing member 140A, as illustrated in FIG. 16. At this time, the biasing member 240A is compressed by reactive force applied to the blocking member 230A. Accordingly, the coolant R flows between the connecting shaft portion 105A and the connecting shaft portion 205A.

On the other hand, when the connecting shaft portion 105A is removed from the connecting shaft portion 205A, the blocking member 130A is pressed against the receptacle 206A, as illustrated in FIG. 15, thereby suppressing outflow of the coolant R from the connecting shaft portion 105A, and also, the blocking member 230A is pressed against a distal end portion of the connection shaft portion 205A, thereby suppressing outflow of the coolant R from the connection shaft portion 205A.

The modifications described above can be applied to the above embodiment alone or in combination of a plurality thereof.

For example, in a vehicle in which the battery is replaceable, there is a problem of rainwater running along the vehicle-body-side connecting portion and reaching the battery-side connecting portion. This problem is solved by applying the second modification and the fourth modification to the above embodiment.

Also, in a vehicle in which the battery is replaceable, there is a problem of outflow of the coolant from the battery-side coolant pipe and the vehicle-body-side coolant pipe when the battery is removed from the vehicle body. This problem is solved by applying the second modification and the fifth modification to the above embodiment.

It will be appreciated by those skilled in the art that the exemplary embodiment described above is a specific example of the aspects described below.

Form 1

A vehicle includes a vehicle body including a mounting portion that opens downward and that is configured to mount a battery, and the battery that is detachably mountable to the mounting portion. The battery includes a battery main body, and a battery-side connecting portion that protrudes upward from the battery main body. The mounting portion includes a vehicle-body-side connecting portion that fits with the battery-side connecting portion. The battery-side connecting portion is movable relative to the battery main body in the lateral direction.

In this battery replacing device, the battery-side connecting portion is movable relative to the battery main body in the lateral direction, and accordingly the vehicle-body-side connecting portion and the battery-side connecting portion can be easily aligned.

Form 2

The vehicle according to Form 1, wherein the battery-side connecting portion includes a connecting shaft portion that is shaped linearly, and a plate that protrudes outward from the connecting shaft portion in a direction orthogonal to an axial direction of the connecting shaft portion, wherein the battery main body includes a holding portion that holds the plate by clamping from both sides in an up-down direction, and wherein the holding portion holds the plate such that the plate is movable in the lateral direction.

In this Form, relative movement of the battery-side connecting portion with respect to the battery main body in the lateral direction is permitted, while relative movement of the battery-side connecting portion with respect to the battery main body in the axial direction of the connecting shaft portion is restricted.

Form 3

The vehicle according to Form 1 or 2, wherein the vehicle-body-side connecting portion includes a guide portion that guides the battery-side connecting portion, and wherein a shape of the guide portion gradually increases in diameter the further downward.

In this Form, the battery-side connecting portion is guided by the guide portion when the battery-side connecting portion is fitted to the vehicle-body-side connecting portion, and accordingly fitting defects of the battery-side connecting portion to the vehicle-body-side connecting portion are suppressed.

Form 4

The vehicle according to any one of Forms 1 to 3, wherein the mounting portion further includes a rainproofing portion that is provided around the vehicle-body-side connecting portion and of which a shape extends downward.

In this Form, even when rainwater reaches the mounting portion of the vehicle body, for example, the rainwater will run along the rainproofing portion and fall away. Accordingly, rainwater can be suppressed from running along the vehicle-body-side connecting portion and reaching the battery-side connecting portion.

Form 5

The vehicle according to any one of Forms 1 to 4, wherein the battery-side connecting portion includes a battery-side connector that is configured to electrically connect the battery main body to the vehicle body, and the vehicle-bodyside connecting portion includes a vehicle body side connector that is electrically connectable to the battery-side connector.

Form 6

The vehicle according to any one of Forms 1 to 5, wherein the battery-side connecting portion includes a battery-side coolant pipe through which a coolant for cooling the battery main body flows, and wherein the vehicle-body side connecting portion includes a vehicle-body-side coolant pipe that fits into the battery side coolant pipe.

Form 7

The vehicle according to Form 6, wherein the battery-side coolant pipe is configured to cut off outflow of the coolant when removed from the vehicle-body-side coolant pipe, and wherein the vehicle-body-side coolant pipe is configured to cut off outflow of the coolant when removed from the battery-side coolant pipe.

In this Form, outflow of coolant from both the battery-side coolant pipe and the vehicle-body-side coolant pipe is suppressed when the battery is removed from the vehicle body.

The embodiment disclosed herein should be considered to be exemplary and not restrictive in all respects. The scope of the disclosure is set forth in the claims, rather than in the above description of the embodiments, and further is intended to include all modifications within the meaning and the scope equivalent to the claims.

What is claimed is:

1. A vehicle comprising:

a vehicle body including a mounting portion that opens downward and that is configured to mount a battery; and the battery that is detachably mountable to the mounting portion, wherein the battery includes a battery main body, and a battery-side connecting portion that protrudes upward from the battery main body, wherein the mounting portion includes a vehicle-body-side connecting portion that fits with the battery-side connecting portion, wherein the battery-side connecting portion is movable relative to the battery main body in a lateral direction, wherein the battery-side connecting portion includes a connecting shaft portion that is shaped linearly, and a plate that protrudes outward from the connecting shaft portion in a direction orthogonal to an axial direction of the connecting shaft portion, wherein the battery main body includes a holding portion that holds the plate by clamping from both sides in an up-down direction, and wherein the holding portion holds the plate such that the plate is movable in the lateral direction.

2. The vehicle according to claim 1, wherein the vehicle-body-side connecting portion includes a guide portion that guides the battery-side connecting portion, and wherein a shape of the guide portion gradually increases in diameter the further downward.

3. The vehicle according to claim 1, wherein the mounting portion further includes a rain-proofing portion that is provided around the vehicle-body-side connecting portion and of which a shape extends downward.

4. The vehicle according to claim 1, wherein the battery-side connecting portion includes a battery-side connector that is configured to electrically connect the battery main body to the vehicle body, and wherein the vehicle-body-side connecting portion includes a vehicle body side connector that is electrically connectable to the battery-side connector.

5. A vehicle comprising: a vehicle body including a mounting portion that opens downward and that is configured to mount a battery; and the battery that is detachably mountable to the mounting portion, wherein the battery includes a battery main body, and a battery-side connecting portion that protrudes upward from the battery main body, wherein the mounting portion includes a vehicle-body-side connecting portion that fits with the battery-side connecting portion;

wherein the battery-side connecting portion is movable relative to the battery main body in a lateral direction wherein the battery-side connecting portion includes a battery-side coolant pipe through which a coolant for cooling the battery main body flows, and wherein the vehicle-body-side connecting portion includes a vehicle-body-side coolant pipe that fits into the battery-side coolant pipe.

6. The vehicle according to claim 5, wherein the battery-side coolant pipe is configured to cut off outflow of the coolant when removed from the vehicle-body-side coolant pipe, and wherein the vehicle-body-side coolant pipe is configured to cut off outflow of the coolant when removed from the battery-side coolant pipe.

\* \* \* \* \*